(12) United States Patent
Martini (10) Patent No.: US 8,976,666 B2
(45) Date of Patent: Mar. 10, 2015

(54) LOAD BALANCING NETWORK ADAPTER

(71) Applicant: Phantom Technologies, Inc., San Diego, CA (US)

(72) Inventor: Paul Michael Martini, San Diego, CA (US)

(73) Assignee: iboss, Inc., San Diego, CA (US)

( * ) Notice: Subject to any disclaimer, the term of this patent is extended or adjusted under 35 U.S.C. 154(b) by 0 days.

(21) Appl. No.: 13/951,392

(22) Filed: Jul. 25, 2013

(65) Prior Publication Data

US 2015/0029850 A1    Jan. 29, 2015

(51) Int. Cl.
*H04L 12/26*      (2006.01)
*H04L 12/803*     (2013.01)

(52) U.S. Cl.
CPC ................................... *H04L 47/125* (2013.01)
USPC ........... 370/235; 370/216; 370/229; 370/231; 370/254; 370/392; 709/238; 709/241; 709/225; 709/226

(58) Field of Classification Search
USPC ......... 370/216, 229, 230, 231, 235, 237, 254, 370/389, 392; 709/238, 241, 224, 225, 226
See application file for complete search history.

(56) References Cited

U.S. PATENT DOCUMENTS

| | | | |
|---|---|---|---|
| 6,182,139 B1 | 1/2001 | Brendel | |
| 6,243,360 B1 * | 6/2001 | Basilico | 370/231 |
| 6,393,483 B1 * | 5/2002 | Latif et al. | 709/226 |
| 6,424,621 B1 * | 7/2002 | Ramaswamy et al. | 370/230 |
| 6,553,005 B1 * | 4/2003 | Skirmont et al. | 370/285 |
| 6,590,861 B1 * | 7/2003 | Vepa et al. | 370/216 |
| 6,591,303 B1 * | 7/2003 | Hendel et al. | 709/238 |
| 6,804,233 B1 * | 10/2004 | Congdon et al. | 370/389 |
| 6,909,713 B2 * | 6/2005 | Magnussen et al. | 370/389 |
| 7,443,868 B2 * | 10/2008 | Suzuki et al. | 370/401 |
| 7,633,871 B1 * | 12/2009 | Callon | 370/235 |
| 7,929,439 B1 * | 4/2011 | Underwood et al. | 370/230 |
| 8,259,585 B1 * | 9/2012 | S P et al. | 370/237 |
| 2002/0107962 A1 * | 8/2002 | Richter et al. | 709/225 |
| 2005/0044221 A1 * | 2/2005 | Venkatanarayan et al. | 709/225 |
| 2005/0055435 A1 * | 3/2005 | Gbadegesin et al. | 709/224 |
| 2006/0029097 A1 * | 2/2006 | McGee et al. | 370/468 |
| 2006/0034190 A1 * | 2/2006 | McGee et al. | 370/254 |
| 2006/0221930 A1 * | 10/2006 | Sweeney et al. | 370/351 |
| 2007/0268915 A1 * | 11/2007 | Zelig et al. | 370/401 |
| 2008/0091845 A1 * | 4/2008 | Mills et al. | 709/246 |
| 2009/0003384 A1 * | 1/2009 | Rozental | 370/485 |
| 2009/0285098 A1 * | 11/2009 | Qi | 370/235 |
| 2011/0047555 A1 * | 2/2011 | Lakshmanan et al. | 718/105 |
| 2011/0267942 A1 * | 11/2011 | Aybay et al. | 370/230 |
| 2011/0321058 A1 * | 12/2011 | Schmidt | 718/105 |
| 2012/0033669 A1 * | 2/2012 | Mohandas et al. | 370/392 |
| 2012/0207175 A1 * | 8/2012 | Raman et al. | 370/412 |
| 2012/0263033 A1 * | 10/2012 | Kalla et al. | 370/221 |
| 2013/0077492 A1 * | 3/2013 | Scaglione | 370/235 |
| 2013/0094356 A1 * | 4/2013 | Keith et al. | 370/229 |

* cited by examiner

*Primary Examiner* — Andrew Lai
*Assistant Examiner* — Andrew C Lee
(74) *Attorney, Agent, or Firm* — Fish & Richardson P.C.

(57) ABSTRACT

Methods and systems for providing device-specific authentication are described. One example method includes receiving, by an input port of a network adapter within the computer system, a stream of network traffic; dividing, by load balancing logic within the network adapter, the received stream of network traffic into a plurality of substreams; and presenting the plurality of substreams to respective interfaces of the network adapter, each network adapter interface being accessible by an operating system executing on the computer system.

22 Claims, 4 Drawing Sheets

LOAD BALANCING NETWORK ADAPTER

BACKGROUND

This specification generally relates to providing integrated load balancing within a computer system.

Load balancing is the act of splitting network traffic between a set of different destinations in order to distribute the overall workload among multiple different devices and/or processes. In some cases, load balancing may be performed by a dedicated computing device that receives traffic from a network, and sends a portion of the traffic over the network to each of two or more servers. The load balancing may be performed such that each of the two or more servers receives roughly the same amount of network traffic.

SUMMARY

In general, one aspect of the subject matter described in this specification may be embodied in systems and methods performed by data processing apparatus that include the actions of receiving, by an input port of a network adapter within the computer system, a stream of network traffic; dividing, by load balancing logic within the network adapter, the received stream of network traffic into a plurality of substreams; and presenting the plurality of substreams to respective interfaces of the network adapter, each network adapter interface being accessible by an operating system executing on the computer system.

Details of one or more implementations of the subject matter described in this specification are set forth in the accompanying drawings and the description below. Other features, aspects, and potential advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Load balancing applications within networks generally are performed by dedicated computing devices operable to receive data from the network on a network interface, and send portions of the data to one or more remote computers over a second network or the same network. This approach may prove costly as dedicated load balancing devices may be expensive, and managing many separate computing devices may be complex, and time-consuming.

Accordingly, in some implementations, the present system and techniques provide load-balancing functionality integrated into a network interface card. The network interface card may include load-balancing logic operable to split an input stream received from a network into a plurality of substreams. The substreams may then be presented to an operating system running on a computing system containing the network interface card. Each of the substreams may then be processed separately by processes executed by the operating system. For example, the network interface card may split the input stream into four substreams, and present each of the substreams to the operating system on a separate interface (e.g., /eth0, /eth1, etc.). Different processes, or threads within a single process, may receive the substreams from the operating system interfaces and process the data in the substreams.

This approach has several potential advantages. As discussed above, the costs and/or complexity of deploying a load balanced configuration may be reduced. Further, the present solution may allow computing devices that include multiple processors or multiple processor cores to be utilized more efficiently, because the substreams associated with the different interfaces may be processed by different processes or threads within a single process simultaneously.

Figure 1:
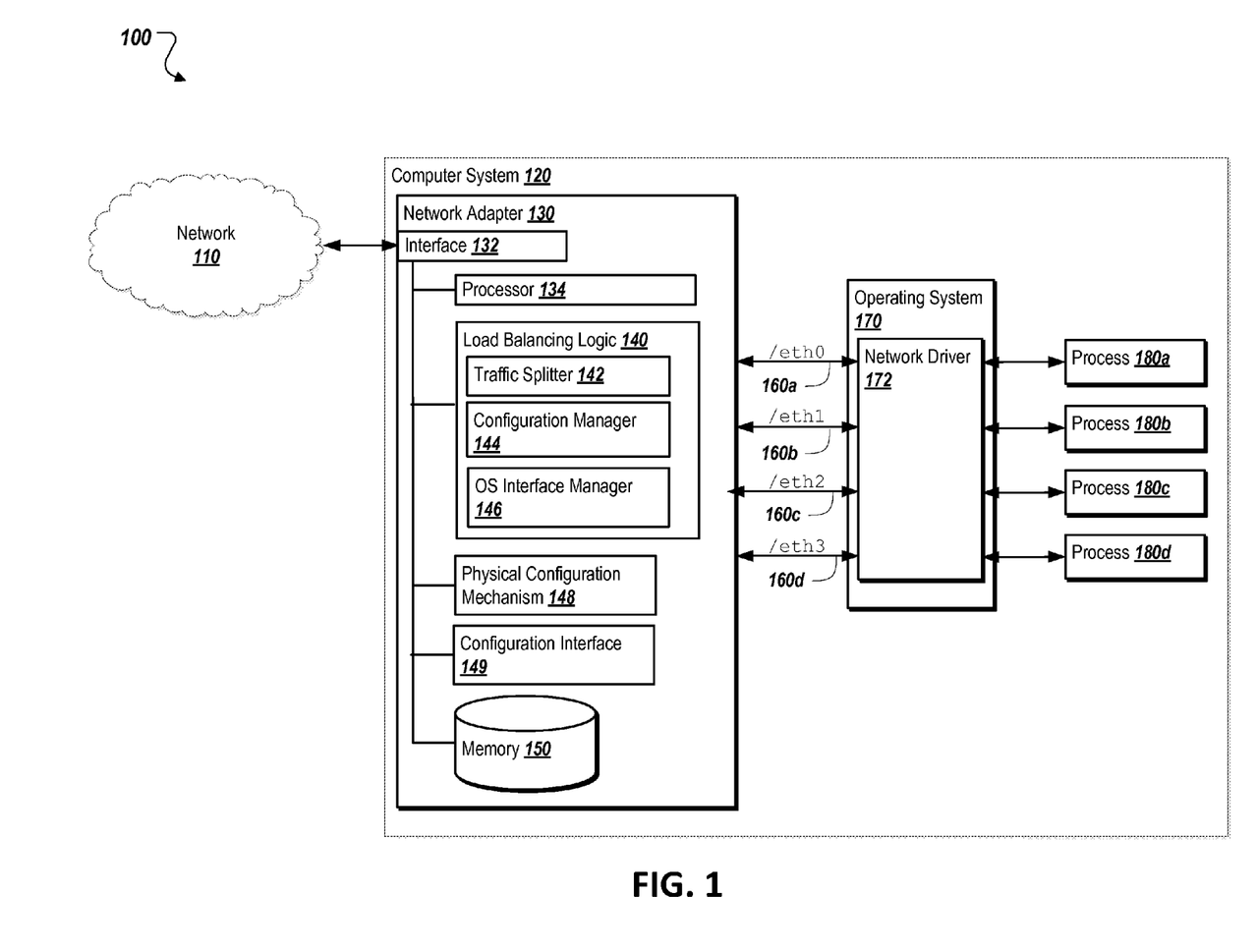
FIG. 1 is a diagram of an example environment.

FIG. 1 is a diagram of an example environment 100. In the illustrated implementation, the example environment 100 includes a network 110 connected to a computer system 120 including a network adapter 130 the network adapter 130 provides network traffic received from the network 110 to an operating system 170 via one or more operating system interfaces 160a-d. A network driver 172 included in the operating system interfaces with the network adapter to service the one or more interfaces 160a-d, and provides network traffic from the one or more interfaces 160a-d to one or more processes 180a-d.

In operation, the network adapter 130 receives packets from the network 110, and processes the packets using load balancing logic 140 included in the network adapter 130. The load balancing logic 140 determines to which of the one or more interfaces 160a-d each packet received from the network 110 should be sent, and then provides the packet to the interface. In some implementations, the network adapter 130 includes various configuration mechanisms, such as physical configuration mechanism 148 and configuration interface 149, which allow the behavior of the load balancing logic 140 to be configured by an administrator or owner of the network after 130. For example, the physical configuration mechanism 148 may be a physical toggle switch that controls the number of interfaces the load balancing logic 140 splits the traffic into. In another example, the configuration interface 149 may be a serial port into which an administrator can connect serial cable and configure the network adapter using a computing device.

As shown, the example environment 100 includes a network 110. In some implementations, the network 110 may be any suitable wired or wireless network implemented according to any networking technology or combination of technologies, including, but not limited to, Ethernet, Optical Carrier, Synchronous Optical Networking (SONET), Frame Relay or any other suitable technology. In addition, the network 110 may utilize any protocol or combination of protocols for communication between computing devices, including, but not limited to, Transport Control Protocol (TCP), Universal Datagram Protocol (UDP), Internet Protocol (IP), File Transfer Protocol (FTP), Hypertext Transfer Protocol (HTTP), Session Initiation Protocol (SIP), H.323, or any other suitable protocol or combination of protocols.

The environment 100 also includes a computer system 120. In some implementations, the computer system 120 may be an off-the-shelf consumer computer system, such as a personal computer (PC) or an Apple® Macintosh computer. Computer system 120 may also be a server computer housed in the data center, such as a blade server. The computer system 120 may also be a mobile device, such as a smart phone, a laptop, tablet, or any other type of mobile device.

The computer system 120 includes an operating system 170. In some implementations, the operating system may be any operating system capable of running on the computer systems discussed above, including, but not limited to, Microsoft® Windows, Apple® OSX, Apple® iOS, Android, Linux, Berkeley Software Distribution (BSD), UNIX, or any other suitable operating system.

As shown, the operating system 170 includes a network driver 172. In some implementations, the network driver 172 may be a standard network adapter driver included with the operating system 170, and operable to interface with the network adapter 130. The network adapter 172 may be a software process or module written in any suitable programming language, including, but not limited to, Java, Visual Basic, C, C++, or any other suitable programming language. The network driver 172 may interface with the network adapter 130 in order to receive network traffic on the one or more operating system interfaces 160a-d. For example, the network driver 172 may subscribe to interrupts that the network adapter 130 will provide when data is to be presented on one of the operating system interfaces 160a-d. In some implementations, the single instance of the network driver 172 may perform all interactions with the network adapter 130. Multiple instances of the network driver, such as one per operating system interface 160a-d, may also be used.

The computer system 120 also includes one or more processes 180a-d. In some implementations, the processes 180a-d are software programs executed by the operating system 170, such as programs run by a user of the computer system 120. For example, the processes 180a-d may be instances of a web server program receiving data from the network adapter. Although a one-to-one correspondence between processes 180a-d and operating system interfaces 160a-d is shown in FIG. 1, other implementations may include different configurations such as one interface to many processes or one process to many interfaces.

The computer system 120 also includes a network adapter 130. In some implementations, the network adapter 130 is a hardware card insertable into an expansion slot of the computer system 120 that interfaces with the rest of the computer system via a communications device, such as a PCI bus. The network adapter 130 may also be an external peripheral from the computer system 120 that connects via an external connections such as Universal Serial Bus (USB). In some cases, the network adapter 130 may be a standard network card including programmable components such as a Field Programmable Gate Array (FPGA) or Erasable Programmable Read Only Memory (EPROM).

As shown, the network adapter 130 includes an interface 132. The interface 132 is used by the network adapter 130 for communicating with the network 110. Generally, the interface 132 comprises logic encoded in software and/or hardware in a suitable combination and operable to communicate with the network 110. More specifically, the interface 132 may comprise software supporting one or more communication protocols associated with communications such that the network 120 or interface's hardware is operable to communicate physical signals within and outside of the illustrated environment 100. In some implementations, the interface 132 may include a physical network interface port for connecting the network adapter 132 the network 110. Such a physical network interface port may be of any suitable type, including, but not limited to, category 5 (CAT5) or category 6 (CAT6) cable, coaxial cable, optical fiber, or any other suitable network interface port.

As illustrated in FIG. 1, the network adapter 130 includes a processor 134. Although illustrated as a single processor 134 in FIG. 1, two or more processors may be used according to particular needs, desires, or particular implementations of distributed computing system 100. Each processor 134 may be a central processing unit (CPU), a blade, an application specific integrated circuit (ASIC), a field-programmable gate array (FPGA), or another suitable component. Generally, the processor 134 executes instructions and manipulates data to perform the operations of the network adapter 130.

The network adapter 130 also includes a memory 150, or multiple memories 150. The memory 150 may include any type of memory or database module and may take the form of volatile and/or non-volatile memory including, without limitation, magnetic media, optical media, random access memory (RAM), read-only memory (ROM), removable media, or any other suitable local or remote memory component. The memory 150 may store various objects or data, including caches, classes, frameworks, applications, backup data, jobs, web pages, web page templates, database tables, and any other appropriate information including any parameters, variables, algorithms, instructions, rules, constraints, or references thereto associated with the purposes of the network adapter 130. Additionally, the memory 150 may include any other appropriate data, such as VPN applications, firmware logs and policies, firewall policies, a security or access log, print or other reporting files, as well as others. In some implementations, the load balancing logic 140 may be stored in the memory 150 and executed by the processor 134. In implementations in which the load balancing logic 140 is embodied in hardware, such as an ASIC or FPGA, the memory 150 may be omitted.

The network adapter 130 includes load balancing logic 140. In some implementations, the load balancing logic 140 may be firmware instructions included in the memory 150 and executed by the processor 134. The load balancing logic 140 may also be included in an FPGA or EEPROM, or any custom Application Specific Integrated Circuit (ASIC). In operation, the load balancing logic 140 may examine traffic received from the network 110, and determine on which of the one or more interfaces 160a-d the traffic should be provided to operating system 170. For example, when a packet is received from the network 110 by the network adapter 130, the packet may be passed to the load balancing logic 140. Load balancing logic 140 may analyze the content of the packet, and determine which of the one or more operating system interfaces 160a-d the packet should be provided on.

Load balancing logic 140 includes a traffic splitter 142. In operation, the traffic splitter 142 may analyze the contents of a packet from the network 110 and determine to which of the one or more operating system interfaces 160a-d to provide the packet. In some implementations, the traffic splitter 142 may perform a numerical operation on the packet to associated it with one of the one or more interfaces 160a-d. For example, the traffic splitter 142 may perform a modulo operation on a MAC address associated with the packet to associate the packet with one of the four interfaces 160a-d (e.g., MAC address mod 4). The traffic splitter 142 may also divide the traffic using a round-robin, random, or pseudorandom algorithm. In some implementations, the traffic splitter 142 may execute a hash function on a portion of the packet to determine the outbound interface. Such a hash function may be any function that divides numerical values into the same number of discrete groups as there are operating system interfaces. For example, a hash function for the illustrated environment 100 may be chosen to divide the traffic into four groups, one for each of the operating system interfaces 160a-d.

Load balancing logic 140 also includes a configuration manager 144. In some implementations, the configuration manager 144 may be operable to receive configuration information from the physical configuration mechanism 148 and/or the configuration interface 149. The configuration manager 144 may also be operable to alter the behavior of the load balancing logic 140 based on this configuration information. For example, the configuration manager 144 may observe the position of the physical configuration mechanism 148, and may change the algorithm used by the traffic splitter. In another example, the configuration manager 144 may receive commands from the configuration interface 149, and alter the number of operating system interfaces 160a-d provided by the network adapter 130. In some implementations, the configuration manager 144 may store receive configuration information in the memory 150.

The load balancing logic 140 also includes an operating system interface manager 146. In operation, the operating system interface manager 146 may interface with the operating system 170 by providing the operating system interfaces 160a-d. The operating system interface manager 146 may be operable to send packets to the various operating system interfaces 160a-d as instructed by the traffic splitter 142. In some implementations, the operating system interface manager may respond to commands sent by the network driver 172, such as commands instructing it to read from or write to the operating system interfaces 160a-d.

Network adapter 130 also includes a physical configuration mechanism 148. In operation, the physical configuration mechanism 148 may allow an administrator to configure various aspects of the load balancing logic 140 using the physical mechanism attached to the network adapter 130. In some implementations, the physical configuration mechanism 148 may be any physical structure operable to allow an administrator to indicate different desired values for a setting, including, but not limited to, a switch, a jumper, the scroll wheel, toggle, or any other suitable physical structure. The physical configuration mechanism 148 may also include multiple configuration mechanisms operable to control different aspects of the load balancing logic 140. In some implementations, the physical configuration mechanism 148 may be operable to control the number of operating system interfaces provided by the network adapter 130, the algorithm used to split network traffic among the one or more operating system interfaces, or any other suitable aspect of the load balancing logic 140.

Network adapter 130 also includes a configuration interface 149. In operation, the configuration interface 149 may allow an administrator to update the configuration of the network adapter 130 by providing information electronically. For example, an administrator may connect a computing device to the configuration interface 149, and be presented with a text-based menu system including configuration options for the network adapter 130. The configuration options may include, but are not limited to, setting the traffic splitting algorithm used by the load balancing logic 140, setting the number of operating system interfaces 160a-d provided by the network adapter 130, setting attributes of the operating system interfaces 160a-d, setting properties of the interface 132 related to how the network adapter 130 interfaces with the network 110, or any other suitable configuration options. In some implementations, the configuration interface 149 may include an electronic interface or combination of interfaces, such as, for example, a serial port, an Ethernet port, a USB port, an IEEE 1394 port, an EEPROM slot, or any other suitable electronic interface.

Figure 2:
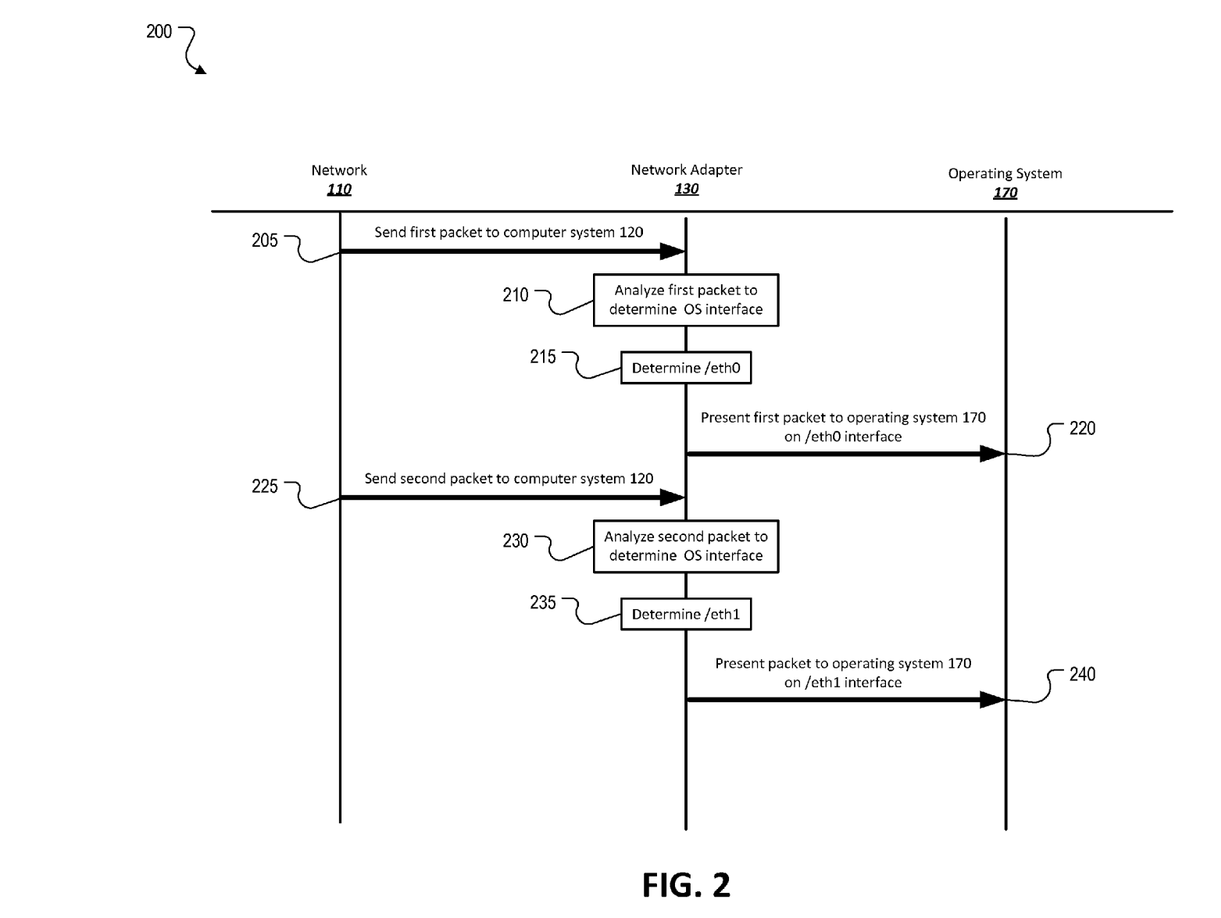
FIG. 2 is a message flow diagram of an example interaction between the components of the example network to provide integrated load balancing within the computer system.

FIG. 2 is a message flow diagram of an example interaction between the components of the example network to provide integrated load balancing within the computer system. At 205, a first packet is sent from the network 110 to the computer system 120 where is received by the network adapter 130. At 210, the network adapter 130 analyzes the first packet to determine which operating system interface the packet should be presented to. In some implementations, the network adapter 130 may perform a numerical operation on the packet to determine the associated operating system interface, as described relative to FIG. 1. At 215, the network adapter 130 determines that the packet should be presented on interface "/eth0."

At 220, the network adapter 130 presents the first packet to the operating system on the operating system interface. In some implementations, the first packet is presented to the operating system 170 by placing the packet in a known memory location and notifying the operating system that new data is present, such as by calling an interrupt. The first packet may also be presented to the operating system in any other suitable manner or combination of manners.

At 225, a second packet is sent from the network 110 to the computer system 120, where is received by the network adapter 130. At 230, the network adapter 130 analyzes the second packet to determine the operating system interface. In some implementations, the analysis at 230 is identical to the analysis at 210. In some cases, network adapter 130 may analyze different packets in different ways when determining which operating system interface to present them on. At 235, the network adapter 130 determines that the second packet should be presented on interface "/eth1." At 240, the second packet is presented to the operating system on the "eth1" interface.

Figure 3:
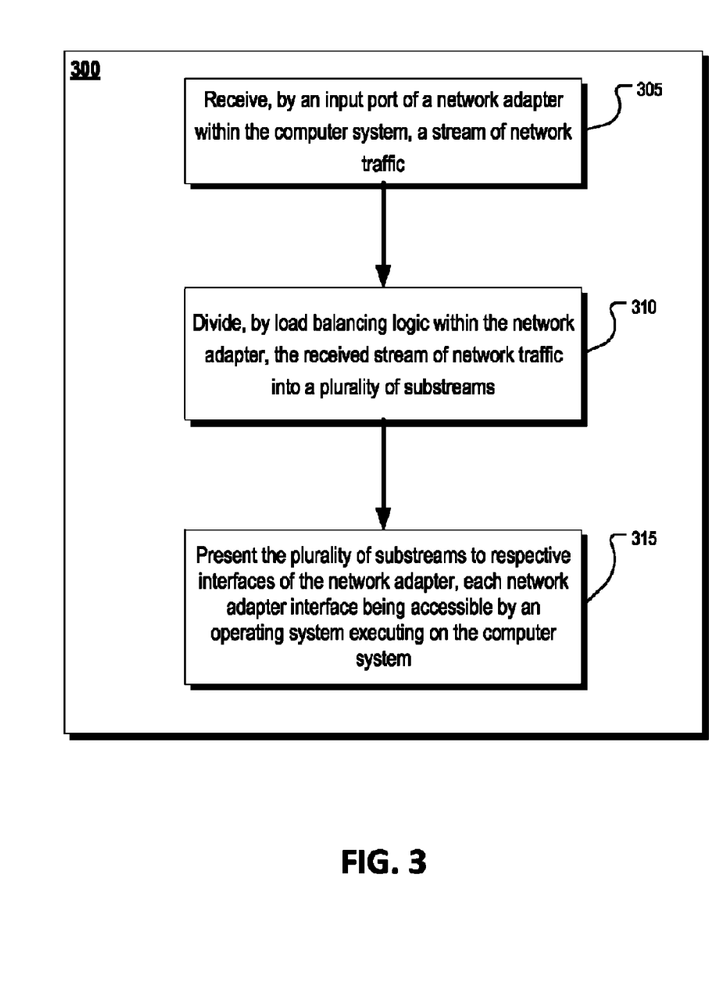
FIG. 3 is a flow chart of an example process of providing integrated load balancing.

FIG. 3 is a flow chart of an example process of providing integrated load balancing within the computer system. At 305, a stream of network traffic is received by input port of a network adapter within a computer system. In some cases, the stream of network traffic may include one or more packets, frames, messages, datagrams, or any other unit of network traffic. The stream of network traffic may also include traffic that is delivered in bursts, and is not limited to continuous streams of traffic. The input port of the network adapter may be any suitable type of physical network interface, including, but not limited to, CAT5 or CAT6 cable, coaxial cable, optical fiber, or any other suitable physical network interface.

At 310, the received stream of network traffic is divided into a plurality of substreams by load balancing logic within the network adapter. In some implementations, the stream is divided into a plurality of substreams as described relative to FIG. 1. At 315, the plurality of substreams are presented to respective interfaces of the network adapter, each network adapter interface being accessible by an operating system executing on the computer system. In some implementations, the substreams are presented to the operating system as described relative to FIG. 1.

In some implementations, presenting the plurality of substreams to respective interfaces of the network adapter may include presenting the plurality of substreams to a standard driver included with the operating system. In some cases, the standard driver may also be an industry-standard or generic driver designed to be used with many different network adapters. The standard driver may also include any driver written to the specifications of a standard API for a network adapter. In some instances, the use of a standard driver may allow the network adapter to be used in a variety of different computer system configurations.

In some implementations, the method 300 may include setting a number of substreams into which the received stream of network traffic is divided based at least in part on the position of an actuatable physical mechanism connected to the network adapter. The physical mechanism may include any suitable mechanism or combination of mechanisms, including, but not limited to, a toggle, a slider, a switch, a jumper, a scroll wheel, or any other suitable mechanism.

In some implementations, the method 300 may include setting a load balancing algorithm by which the received stream of network traffic is divided based at least in part on a position of the physical mechanism. The load balancing algorithm may include any suitable load balancing algorithm, including, but not limited to, hashing by source IP address, hashing by destination IP address, hashing by Medium Access Control (MAC) address, determining a round robin position based on the source IP address, determining a round robin position based on the destination IP address, checking whether the source and/or destination IP address is odd or even, a heartbeat algorithm configured to probe the set of output interfaces and remove output interfaces that do not respond to the probe, or any other suitable algorithm or combination of algorithms.

In some cases, the method 300 may also include receiving configuration commands via a configuration interface of the network adapter, and changing at least one of a load balancing algorithm or a number of substreams into which the network traffic is divided based on the received configuration commands. The configuration interface may include any suitable interface, including, but not limited to, a serial interface, a flash chip slot, an electronically programmable read only memory (EPROM) chip slot, a side driver, or any other suitable interface.

Figure 4:
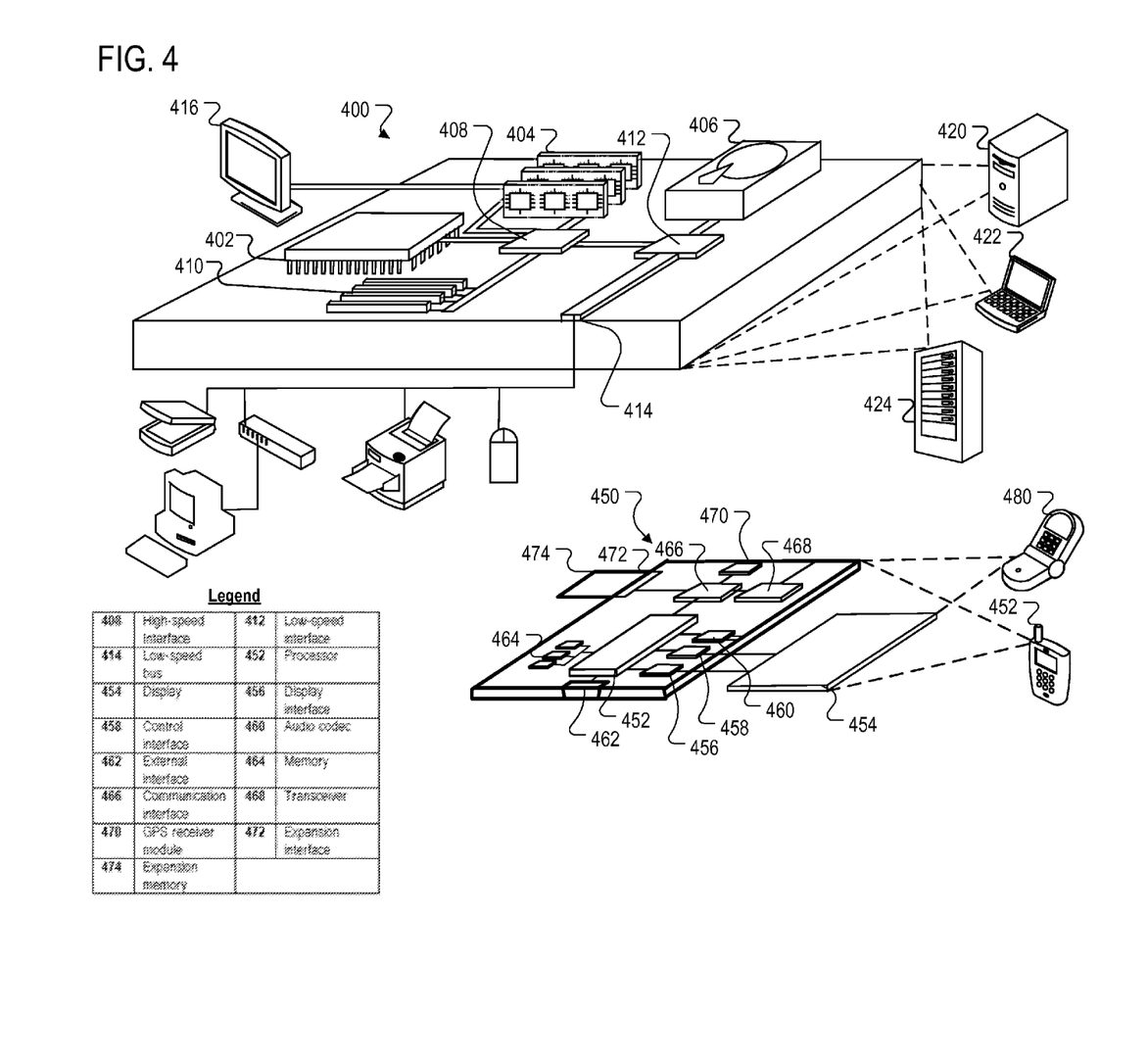
FIG. 4 is a diagram of computing devices that may be used to implement the systems and methods described in this document.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. Additionally computing device 400 or 450 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452 that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-topeer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A method performed by one or more processes executing on a computer system, the method comprising:
   receiving, by an input port of a network adapter within the computer system, a stream of network traffic including a plurality of network packets;
   dividing, by load balancing logic within the network adapter, the received stream of network traffic into a plurality of substreams each associated with a particular interface of the network adapter, wherein dividing the received stream of network traffic includes:
      determining, for each network packet of the plurality of network packets in the received stream of network traffic, a particular substream to which the network packet is to be associated, and
      associating the network packet with the particular substream; and
   presenting the plurality of substreams to the particular interfaces of the network adapter associated with each substream, each network adapter interface being accessible by an operating system executing on the computer system, wherein presenting a particular substream includes presenting the one or more network packets associated with the substream to the interface of the network adapter associated with the particular substream.

2. The method of claim 1, wherein the presenting the plurality of substreams to the particular interfaces of the network adapter associated with each substream includes presenting the plurality of substreams to a standard driver included with the operating system.

3. The method of claim 1, further comprising setting a number of substreams into which the received stream of network traffic is divided based at least in part on the position of an actuatable physical mechanism connected to the network adapter.

4. The method of claim 3, wherein the physical mechanism includes at least one of: a toggle, a slider, a switch, a jumper, or a scroll wheel.

5. The method of claim 1, further comprising setting a load balancing algorithm by which the received stream of network traffic is divided based at least in part on a position of an actuatable physical mechanism connected to the network adapter.

6. The method of claim 5, wherein the load balancing algorithm includes at least one of: hashing by source Internet Protocol (IP) address, hashing by destination IP address, hashing by Medium Access Control (MAC) address, determining a round robin position based on the source IP address, determining a round robin position based on the destination IP address, or a heartbeat algorithm configured to probe the set of output interfaces and remove output interfaces that do not respond to the probe.

7. The method of claim 1, further comprising:
   receiving configuration commands via a configuration interface of the network adapter;
   changing at least one of a load balancing algorithm or a number of substreams into which the network traffic is divided based on the received configuration commands.

8. The method of claim 7, wherein the configuration interface includes at least one of: a serial interface, a flash chip slot, an electronically programmable read only memory (EPROM) chip slot, or a side driver.

9. The method of claim 1, wherein presenting the plurality of substreams to particular interfaces of the network adapter comprises maintaining the substreams within the computer system containing the network adapter without sending the substreams to a computer system other than the computer system containing the network adapter.

10. The method of claim 1, wherein presenting the plurality of substreams to particular interfaces of the network adapter comprises presenting each of the plurality of substreams to a different one of the plurality of interfaces.

11. A network adapter comprising:
   an input port configured to receive a stream of network traffic including a plurality of network packets;
   load balancing logic, operatively coupled to the input port, configured to divide the received stream of network traffic into a plurality of substreams of network traffic each associated with a particular interface of the network adapter, wherein dividing the received stream of network traffic includes:
      determining, for each network packet of the plurality of network packets in the received stream of network traffic, a particular substream to which the network packet is to be associated, and
      associating the network packet with the particular substream; and
   a plurality of operating system interfaces, each operating system interface configured to receive a particular substream of network traffic associated with the operating system interface, and present the received substream of network traffic to an associated process executing in an operating system, wherein presenting the received substream includes presenting the one or more network packets associated with the substream.

12. The network adapter of claim 11, wherein the operating system interfaces are configured to present the plurality of substreams to a standard driver included with the operating system.

13. The network adapter of claim 11, the load balancing logic further configured to set a number of substreams into which the received stream of network traffic is divided based at least in part on the position of an actuatable physical mechanism connected to the network adapter.

14. The network adapter of claim 13, wherein the physical mechanism includes at least one of: a toggle, a slider, a switch, a jumper, or a scroll wheel.

15. The network adapter of claim 11, the load balancing logic further configured to set a load balancing algorithm by which the received stream of network traffic is divided based at least in part on a position of an actuatable physical mechanism connected to the network adapter.

16. The network adapter of claim 15, wherein the load balancing algorithm includes at least one of: hashing by source Internet Protocol (IP) address, hashing by destination IP address, hashing by Medium Access Control (MAC)

address, determining a round robin position based on the source IP address, determining a round robin position based on the destination IP address, or a heartbeat algorithm configured to probe the set of output interfaces and remove output interfaces that do not respond to the probe.

17. The network adapter of claim 11, the load balancing logic further configured to receive configuration commands via a configuration interface of the network adapter; and change at least one of a load balancing algorithm or a number of substreams into which the network traffic is divided based on the received configuration commands.

18. The network adapter of claim 17, wherein the configuration interface includes at least one of: a serial interface, a flash chip slot, an electronically programmable read only memory (EPROM) chip slot, or a side driver.

19. A network adapter comprising:
an input port configured to receive a stream of network traffic including a plurality of network packets;
a processor configured to execute computer program instructions; and
a computer storage medium encoded with computer program instructions that, when executed by the processor, cause the network adapter to perform operations comprising:
dividing, by load balancing logic within the network adapter, the received stream of network traffic into a plurality of substreams each associated with a particular interface of the network adapter, wherein dividing the received stream of network traffic includes:
determining, for each network packet of the plurality of network packets in the received stream of network traffic, a particular substream to which the network packet is to be associated, and
associating the network packet with the particular substream; and
presenting the plurality of substreams to the particular interfaces of the network adapter associated with each substream, each network adapter interface being accessible by an operating system executing on the computer system, wherein presenting a particular substream includes presenting the one or more network packets associated with the substream to the interface of the network adapter associated with the particular substream.

20. The network adapter of claim 19, wherein the operating system interfaces are configured to present the plurality of substreams to a standard driver included with the operating system.

21. The network adapter of claim 19, the operations comprising setting a number of substreams into which the received stream of network traffic is divided based at least in part on the position of an actuatable physical mechanism connected to the network adapter.

22. The network adapter of claim 21, wherein the physical mechanism includes at least one of: a toggle, a slider, a switch, a jumper, or a scroll wheel.

* * * * *